(12) United States Patent
Igata

(10) Patent No.: US 9,083,205 B2
(45) Date of Patent: Jul. 14, 2015

(54) VEHICLE CHARGING DEVICE AND VEHICLE CHARGING SYSTEM USING SAME

(75) Inventor: Yuji Igata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 431 days.

(21) Appl. No.: 13/575,813

(22) PCT Filed: Jan. 28, 2011

(86) PCT No.: PCT/JP2011/000480
§ 371 (c)(1),
(2), (4) Date: Oct. 16, 2012

(87) PCT Pub. No.: WO2011/093094
PCT Pub. Date: Aug. 4, 2011

(65) Prior Publication Data
US 2013/0026988 A1    Jan. 31, 2013

(30) Foreign Application Priority Data
Jan. 29, 2010    (JP) ................................. 2010-018183

(51) Int. Cl.
*H02J 7/00*     (2006.01)
*B60L 11/00*    (2006.01)
(Continued)

(52) U.S. Cl.
CPC ........... *H02J 13/002* (2013.01); *B60L 11/1811* (2013.01); *B60L 11/1816* (2013.01);
(Continued)

(58) Field of Classification Search
CPC ..... B60L 11/18; B60L 11/182; Y02T 90/128; Y02T 90/163; Y02T 10/7088
USPC ............................................. 320/109; 701/22
See application file for complete search history.

(56) References Cited

U.S. PATENT DOCUMENTS 4,686,382 A    8/1987    Shuey
5,191,277 A *  3/1993    Ishikura et al. ............... 320/114
(Continued)

FOREIGN PATENT DOCUMENTS

CN    1809975    7/2006
EP    2 246 957    11/2010
(Continued)

OTHER PUBLICATIONS

English Translaion of Chinese Search Report dated May 21, 2014, for corresponding CN Application No. 201180007679.1, 3 pages.
(Continued)

*Primary Examiner* — M'Baye Diao
(74) *Attorney, Agent, or Firm* — Seed IP Law Group PLLC

(57) ABSTRACT

Disclosed is a vehicle charging device that can perform communication even if the vehicle charging device and a charging instruction device are connected to power line pairs having different phases in a multiple-wire power line. The vehicle charging device includes: a power line communication unit that performs communication over a multiple-wire power line or a power line for vehicles; a power line connection unit that connects a pair of power lines within the multiple-wire power line to the power line for vehicles; and a control unit that controls the connection or the disconnection of the power line connection unit. The power line communication unit selects a signal from a pair of power lines within the multiple-wire power line and communicates with the charging instruction device, and performs communication with the vehicle over the power line for vehicles.

20 Claims, 5 Drawing Sheets

(51) Int. Cl.
  *H02J 13/00* (2006.01)
  *B60L 11/18* (2006.01)
  *H01M 10/44* (2006.01)

(52) U.S. Cl.
  CPC ............ *B60L11/1838* (2013.01); *H01M 10/44* (2013.01); *Y02T 10/7005* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 30/12* (2013.01)

(56) References Cited

U.S. PATENT DOCUMENTS

| | | | |
|---|---|---|---|
| 5,548,200 A * | 8/1996 | Nor et al. | 320/109 |
| 5,929,749 A * | 7/1999 | Slonim et al. | 340/870.01 |
| 6,011,398 A * | 1/2000 | Bald et al. | 324/511 |
| 7,501,913 B2 * | 3/2009 | Hanada et al. | 333/132 |
| 7,804,280 B2 * | 9/2010 | Deaver et al. | 323/210 |
| 8,036,233 B2 * | 10/2011 | Yokomitsu et al. | 370/401 |
| 8,415,918 B2 * | 4/2013 | Tonegawa | 320/109 |
| 8,548,659 B2 | 10/2013 | Tanaka | |
| 8,725,338 B2 | 5/2014 | Tanaka | |
| 2008/0224536 A1 * | 9/2008 | Yamazaki | 307/1 |
| 2009/0134699 A1 | 5/2009 | Choi et al. | |
| 2009/0139781 A1 * | 6/2009 | Straubel | 180/65.1 |
| 2010/0019723 A1 * | 1/2010 | Ichikawa | 320/109 |
| 2010/0145536 A1 * | 6/2010 | Masters et al. | 700/292 |
| 2011/0000726 A1 | 1/2011 | Tanaka | |
| 2011/0022222 A1 | 1/2011 | Tonegawa | |
| 2012/0193983 A1 * | 8/2012 | Yukizane et al. | 307/9.1 |
| 2013/0314040 A1 | 11/2013 | Tanaka | |

FOREIGN PATENT DOCUMENTS

| | | |
|---|---|---|
| JP | 2-50633 A | 2/1990 |
| JP | 7-20151 A | 1/1995 |
| JP | 2001-313595 | 11/2001 |
| JP | 2005-020197 | 1/2005 |
| JP | 2007-43618 4 | 2/2007 |
| JP | 2009-171700 | 7/2009 |
| JP | 2009-195092 | 8/2009 |
| JP | 2009-201198 | 9/2009 |
| WO | 2009/092444 A1 | 7/2009 |
| WO | 2009/104634 A1 | 8/2009 |

OTHER PUBLICATIONS

International Search Report dated Apr. 19, 2011.
Extended European Search Report dated Dec. 15, 2014, for corresponding EP Application No. 11736809.2-1804 / 2530810, 8 pages.

* cited by examiner

VEHICLE CHARGING DEVICE AND VEHICLE CHARGING SYSTEM USING SAME

TECHNICAL FIELD

The present invention relates to a vehicle charging apparatus that supplies power to a vehicle that incorporates an electrical storage apparatus and a motor that rotates the wheels, and drives the motor using power of the electrical storage apparatus, and relates to a vehicle charging system that uses the vehicle charging apparatus.

BACKGROUND ART

In recent years, attention has continued to been drawn to an electric vehicle that incorporates an electrical storage apparatus and a motor that rotates the wheels, and drives the motor using power of the electrical storage apparatus, as an environment-friendly vehicle. With a vehicle of this kind, power is supplied to a power line from a vehicle charging apparatus outside the body of the vehicle, and the supplied power is stored in the electrical storage apparatus (see Patent Literature 1, for example).

CITATION LIST

Patent Literature

PTL 1
Japanese Patent Application Laid-Open No. 2009-171700

SUMMARY OF INVENTION

Technical Problem

In the case of a typical residence, a vehicle charging apparatus is installed inside the residence, and power of a power source inside the residence is used to supply power to a vehicle. The power source inside the residence uses a multi-wire power line with wires mutually separated on a high-frequency basis. Consequently, the vehicle charging apparatus is connected to a pair of power lines within the multi-wire power line.

However, when power line communication is performed using the multi-wire power line, since there is high-frequency separation between power lines, inter-phase coupling loss is on the order of 10 to 30 dB between a pair of different power lines, and stable power line communication cannot be performed. For example, with a three-phase power line (single-phase three-wire system) using an L1 phase, neutral phase, and L2 phase, if a charging instruction apparatus is connected to the pair of the L1 phase and neutral phase power lines, and a vehicle power line is connected to the pair of the L1 phase and L2 phase power lines, there is a problem in that the charging instruction apparatus cannot perform stable communication with the vehicle charging apparatus and control of the vehicle charging apparatus cannot be performed, and therefore power cannot be supplied to a vehicle from the vehicle charging apparatus.

Thus, it is an object of the present invention to enable stable communication to be performed, and power to be supplied from the vehicle charging apparatus to a vehicle, even if the vehicle charging apparatus and the charging instruction apparatus are connected to a pair of power lines having different phases in the multi-wire power line.

Solution to Problem

A vehicle charging apparatus according to a first aspect of the present invention supplies power supplied from a pair of power lines within a multi-wire power line, to a vehicle via a vehicle power line, based on an instruction from a charging instruction apparatus connected to the multi-wire power line, and the vehicle charging apparatus includes a power line communication section that performs power line communication via the multi-wire power line or the vehicle power line, a connection section that connects a pair of power lines within the multi-wire power line to the vehicle power line, and a control section that controls connection or disconnection of the connection section in response to an instruction from the charging instruction apparatus, wherein the power line communication section selects a signal from the pair of power lines within the multi-wire power line and communicates with the charging instruction apparatus, and also communicates with the vehicle via the vehicle power line.

According to this configuration, the vehicle charging apparatus can select signals of different power line pairs and perform communication. This enables the vehicle charging apparatus to perform stable communication since a signal can be selected from a pair of power lines within a multi-wire power line even if the vehicle charging apparatus and the charging instruction apparatus are connected to pairs of power lines having different phases in the multi-wire power line, and by this means the charging instruction apparatus can control the vehicle charging apparatus, and power can be supplied from the vehicle charging apparatus to the vehicle via the vehicle power line.

A vehicle charging system according to a second aspect of the present invention includes the above-described vehicle charging apparatus connected to a multi-wire power line and charging instruction apparatus connected to the multi-wire power line, wherein the vehicle charging apparatus supplies power to a vehicle based on an instruction from the charging instruction apparatus.

According to this configuration, even if the vehicle charging apparatus and the charging instruction apparatus are connected to pairs of power lines having different phases in the multi-wire power line, stable communication can be performed since a signal can be selected from a pair of power lines within the multi-wire power line, and by this means the charging instruction apparatus can control the vehicle charging apparatus, and power can be supplied from the vehicle charging apparatus to the vehicle via the vehicle power line.

A vehicle charging apparatus according to a third aspect of the present invention performs communication with a communication apparatus performing power line communication via a power line that includes at least three conducting wires, and also performs charging of a vehicle, and the vehicle charging apparatus includes a communication section that receives a signal transmitted from the communication apparatus via a pair of the conducting wires within the power line, and a switching section that switches the pair of the conducting wires based on the signal received by the communication section.

According to this configuration, the pair of conducting wires is switched based on the signal received by the communication section, making it possible to perform stable communication with the communication apparatus even if the phase of the power line to which that communication apparatus is connected and the phase of the power line that performs charging of a vehicle are different.

Advantageous Effects of Invention

The present invention enables stable communication to be performed, and power to be supplied from a vehicle charging apparatus to a vehicle, even if the vehicle charging apparatus and a charging instruction apparatus are connected to pairs of power lines having different phases in a multi-wire power line.

DESCRIPTION OF EMBODIMENT

Figure 1:
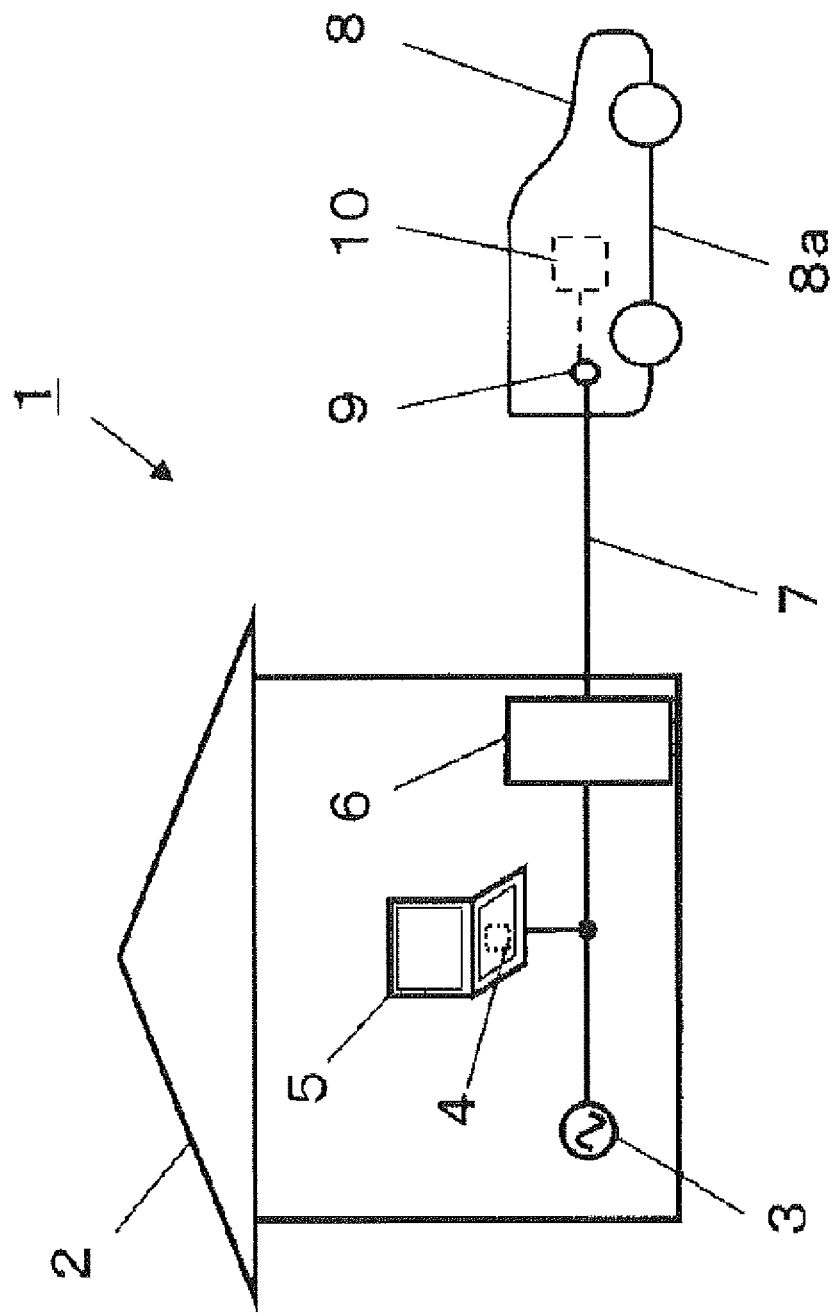
FIG. 1 is a configuration diagram of a vehicle charging system according to an embodiment.

Now, an embodiment of the present invention will be described with reference to the accompanying drawings. Identical or equivalent parts in the drawings are assigned the same reference signs.

Embodiment 1

First, a vehicle charging system according to an embodiment of the present invention will be described with reference to FIG. 1 through FIG. 3. Here, a case is described by way of example in which an electric vehicle incorporates an electrical storage apparatus and a motor that rotates the wheels, and drives the motor using power stored in the electrical storage apparatus. With an electric vehicle, power stored in the electrical storage apparatus is supplied to the motor and the wheels are rotated by the motor, enabling the vehicle to move to another place.

FIG. 1 is a configuration diagram of vehicle charging system 1 according to an embodiment of the present invention. In FIG. 1, vehicle charging system 1 is provided with charging instruction apparatus 5 incorporating power line communication section 4, vehicle charging apparatus 6, and vehicle 8 connected to vehicle charging apparatus 6 via vehicle power line 7.

Charging instruction apparatus 5 is, for example, a communication apparatus such as a personal computer or server.

In typical residence 2, charging instruction apparatus 5 and vehicle charging apparatus 6 are connected to power source 3 of residence 2. By this means, necessary power is supplied to vehicle charging apparatus 6 from power source 3 of residence 2. Vehicle charging apparatus 6 supplies power to vehicle 8 using power of power source 3 of residence 2.

In vehicle charging system 1, after vehicle power line 7 is inserted in power socket 9 of authentication of vehicle 8 is performed by charging instruction apparatus 5, and power is supplied to vehicle 8 only if the authentication is successful. Vehicle 8 is charged with power supplied to electrical storage apparatus 10 installed in vehicle body 8a.

Charging instruction apparatus 5 is configured as a dedicated device. A personal computer may also be used instead of the dedicated device. Via built-in power line communication section 4, charging instruction apparatus 5 uses a power line of power source 3 to perform power line communication with vehicle charging apparatus 6.

In residence 2, a multi-wire power line—for example, a single-phase three-wire system—is used as power source 3. Consequently, vehicle charging apparatus 6 supplies power to vehicle 8 using one pair of power lines within a single-phase three-wire power line.

However, when power line communication is performed using a single-phase three-wire power line, there is high-frequency separation between the power lines of each phase, and therefore inter-phase coupling loss between different pairs of power lines is on the order of 10 to 30 dB, and stable power line communication cannot be performed. That is to say, it is not practically possible to perform power line communication. For example, with a three-phase power line using an L1 phase, neutral phase, and L2 phase, if charging instruction apparatus 5 is connected to the pair of the L1 phase and neutral phase power line, and vehicle power line 7 is connected to the pair of the L1 phase and L2 phase power line, charging instruction apparatus 5 cannot perform stable communication with vehicle charging apparatus 6. Consequently, charging instruction apparatus 5 cannot control vehicle charging apparatus 6. Thus, power cannot be supplied to vehicle 8 from vehicle charging apparatus 6. Also, charging instruction apparatus 5 cannot perform stable communication with vehicle 8 via vehicle charging apparatus 6, and has difficulty in performing authentication.

Thus, in this embodiment, even if vehicle charging apparatus 6 and charging instruction apparatus 5 are connected to pairs of power lines having different phases in a multi-wire power line, communication can be performed stably, vehicle charging apparatus 6 can be controlled by charging instruction apparatus 5, authentication can be performed by means of power line communication between charging instruction apparatus 5 and vehicle 8, and power can be supplied to vehicle 8 from vehicle charging apparatus 6.

Figure 2:
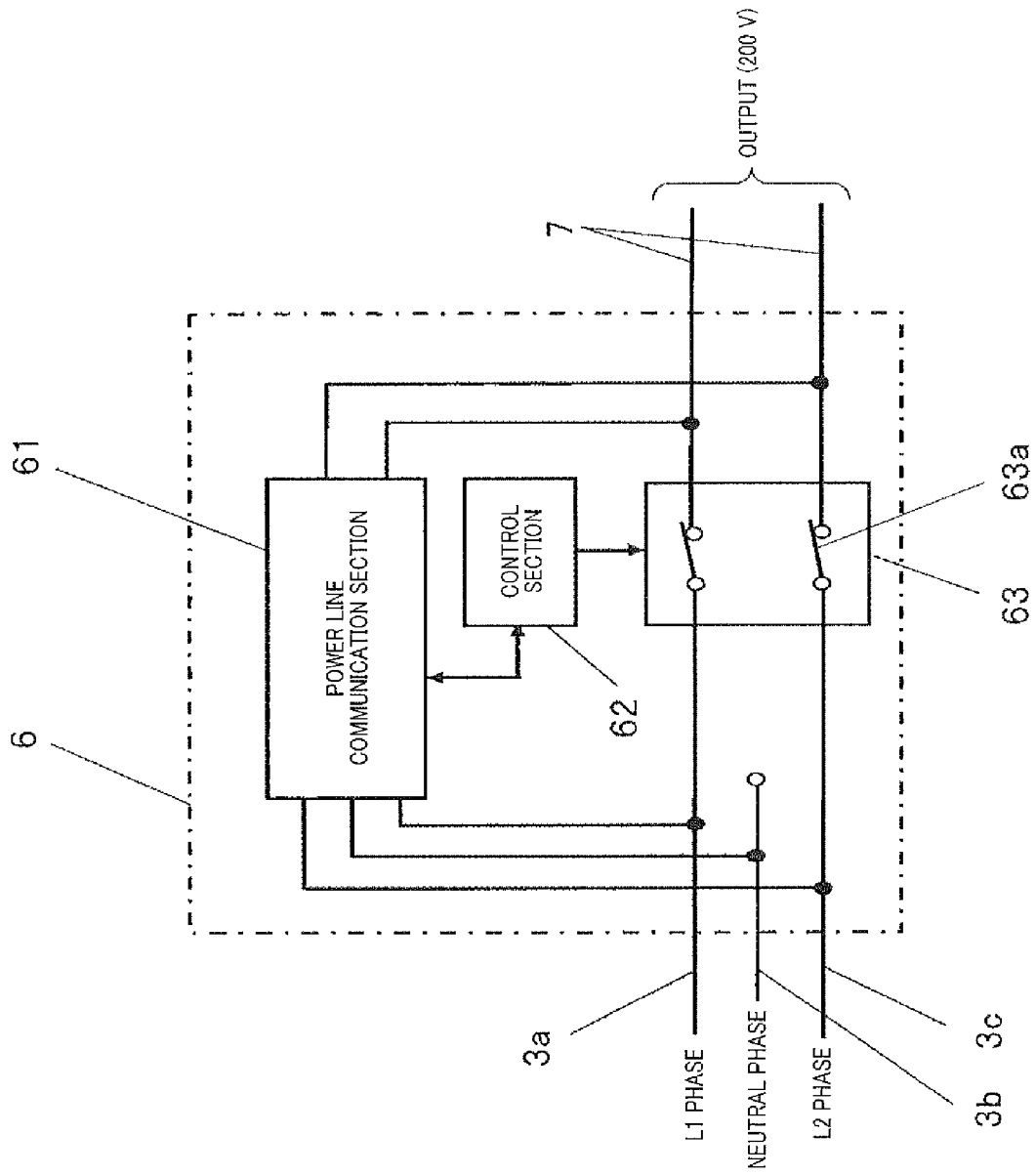
FIG. 2 is a block diagram showing the configuration of a vehicle charging apparatus of the above vehicle charging system.

That is to say, vehicle charging apparatus 6 is configured as shown in FIG. 2. FIG. 2 is a block diagram showing the configuration of vehicle charging apparatus 6 according to an embodiment of the present invention.

As shown in FIG. 2, vehicle charging apparatus 6 supplies vehicle 8 (FIG. 1) with power via vehicle power line 7 based on an instruction from charging instruction apparatus 5 (FIG. 1) connected to the multi-wire power line (a single-phase three-wire power line comprising power lines 3a, 3b, and 3c in FIG. 2), the power being supplied from a pair of power lines within the multi-wire power line.

Vehicle charging apparatus 6 is provided with power line communication section 61 that performs power line communication via the multi-wire power line or vehicle power line 7, power line connection section 63 that connects a pair of power lines within the multi-wire power line to vehicle power line 7, and control section 62 that controls connection or disconnection of power line connection section 63 in response to an instruction from charging instruction apparatus 5. Power line communication section 61 selects a signal from a pair of power lines within the multi-wire power line and communicates with charging instruction apparatus 5, and also performs power line communication with vehicle 8 via vehicle power line 7.

Power line communication section 61 transfers communication information received from charging instruction apparatus 5 to vehicle 8 via vehicle power line 7, and also transfers communication information received from vehicle 8 to charging instruction apparatus 5 via the multi-wire power line. These transfers enables charging instruction apparatus 5 to perform communication with vehicle 8 stably via vehicle charging apparatus 6, and to perform authentication of vehicle 8, even if power line connection section 63 is disconnected.

Thus, vehicle charging apparatus 6 can perform communication while selecting a signal from a pair of power lines having different phases. This enables vehicle charging apparatus 6 to switch to a power line pair having little attenuation when communicating, and thus perform stable communication, even if connected to charging instruction apparatus 5 via the pair of power lines having different phases. Also, charging instruction apparatus 5 can perform power line communication with vehicle 8 via vehicle charging apparatus 6.

Charging instruction apparatus 5 can control vehicle charging apparatus 6, and also perform authentication by means of communication with vehicle 8 via vehicle charging apparatus 6. This enables vehicle charging apparatus 6 to supply power to vehicle 8 via vehicle power line 7 based on an instruction from charging instruction apparatus 5.

In FIG. 2, power line connection section 63 is configured as switch 63a, and performs connection or disconnection between the pair of power lines comprising L1-phase power line 3a and L2-phase power line 3c and vehicle power line 7 according to whether switch 63a is in a closed or open state. When switch 63a is in a closed state, power is supplied to vehicle 8 at a voltage of 200 V. The power line pair is not limited to the L1 phase and L2 phase power line pair, and vehicle power line 7 may also be connected to an L1-phase and neutral-phase power line pair, or to a neutral-phase and L2-phase power line pair. In these cases, a 100 V voltage is supplied to vehicle 8.

Control section 62 is connected to power line communication section 61 and receives an instruction from charging instruction apparatus 5 via power line communication section 61. In addition, control section 62 controls switch 63a of power line connection section 63 so as to be in a closed state (on state) when an instruction received from charging instruction apparatus 5 indicates permission of charging, and controls switch 63a so as to be in an open state (off state) when an instruction received from charging instruction apparatus 5 indicates non-permission of charging.

Charging instruction apparatus 5 issues an instruction on permission of charging to control section 62 of vehicle charging apparatus 6 only for a vehicle 8 for which authentication has been completed, and sends an instruction on non-permission of charging for an unauthorized vehicle 8 that has not been authenticated. This prevents electricity from being thieved for unauthorized vehicle 8 that has not been authenticated in vehicle charging system 1.

The multi-wire power line and vehicle power line 7 may use the same kind of power lines or different kinds of power lines.

Also, in the above embodiment, the single-phase three-wire system has been described as a power transmission method for multi-wire power line by way of example, but the power transmission method for multi-wire power line is not limited to the single-phase three-wire system. The power transmission method for multi-wire power line may be changed to a type used in the area of use of the vehicle charging apparatus.

Next, the specific configuration of power line communication section 61 in vehicle charging apparatus 6 will be described with reference to FIG. 3. FIG. 3 is a block diagram showing a configuration of power line communication section 61 of vehicle charging apparatus 6 according to an embodiment of the present invention.

Figure 3:
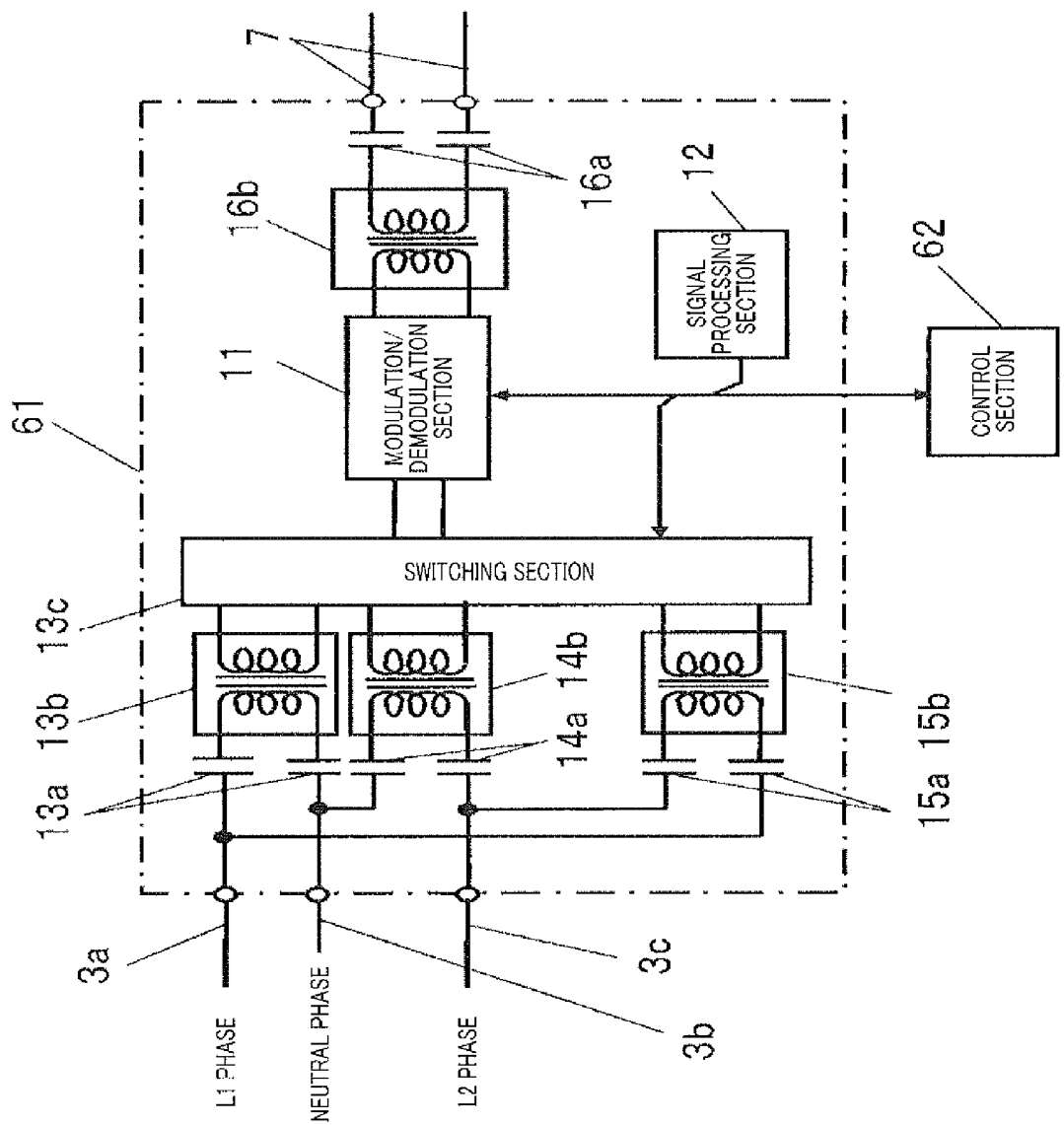
FIG. 3 is a block diagram showing a configuration of a power line communication section of a vehicle charging apparatus of the above vehicle charging system.

As shown in FIG. 3, power line communication section 61 is provided with first couplers 13b, 14b, and 15b that are connected to mutually different pairs of power lines among L1-phase, neutral-phase, and L2-phase power lines 3a, 3b, and 3c via capacitors 13a, capacitors 14a, and capacitors 15a, respectively; modulation/demodulation section 11 that modulates or demodulates a signal; switching section 13c that selects one of first couplers 13b, 14b, and 15b and connects the selected first coupler (first coupler 13b, 14b, or 15b) to modulation/demodulation section 11; signal processing section 12 that decodes a signal demodulated by modulation/demodulation section 11, and second coupler 16b that is connected to modulation/demodulation section 11, and is also connected to vehicle power line 7 via capacitors 16a.

Modulation/demodulation section 11 demodulates communication signals superimposed on power lines 3a, 3b, and 3c to recover data. Modulation/demodulation section 11 also modulates data into high-frequency signals to be superimposed on power lines 3a, 3b, and 3c.

Signal processing section 12 decodes necessary data addressed to itself from the data, and sends this data to control section 62. Signal processing section 12 also sends error information and modulation speed information contained in the data to control section 62. In addition, signal processing section 12 attaches destination information and an error correction code to data sent from control section 62, and sends the data to modulation/demodulation section 11.

Transformers are used for first couplers 13b, 14b, and 15b, and second coupler 16b.

Switching section 13c selects one of first couplers 13b, 14b, and 15b in accordance with a control signal from control section 62.

Specifically, switching section 13c switches the wiring connection between first couplers 13b, 14b, and 15b and modulation/demodulation section 11. When first coupler 13b is selected, first coupler 13b and modulation/demodulation section 11 are connected. When first coupler 14b is selected, first coupler 14b and modulation/demodulation section 11 are connected. When first coupler 15b is selected, first coupler 15b and modulation/demodulation section 11 are connected.

In response to information sent from signal processing section 12, such as channel analysis information, modulation speed information, control information of power line connection section 63 (FIG. 2), control section 62 transfers communication information received by power line communication section 61 from charging instruction apparatus 5 to vehicle 8 via vehicle power line 7, and also transfers communication information received from vehicle 8 to charging instruction apparatus 5 via the multi-wire power line. Also, control section 62 controls opening and closing of power line connection section 63 in accordance with an instruction from charging instruction apparatus 5.

Figure 4:
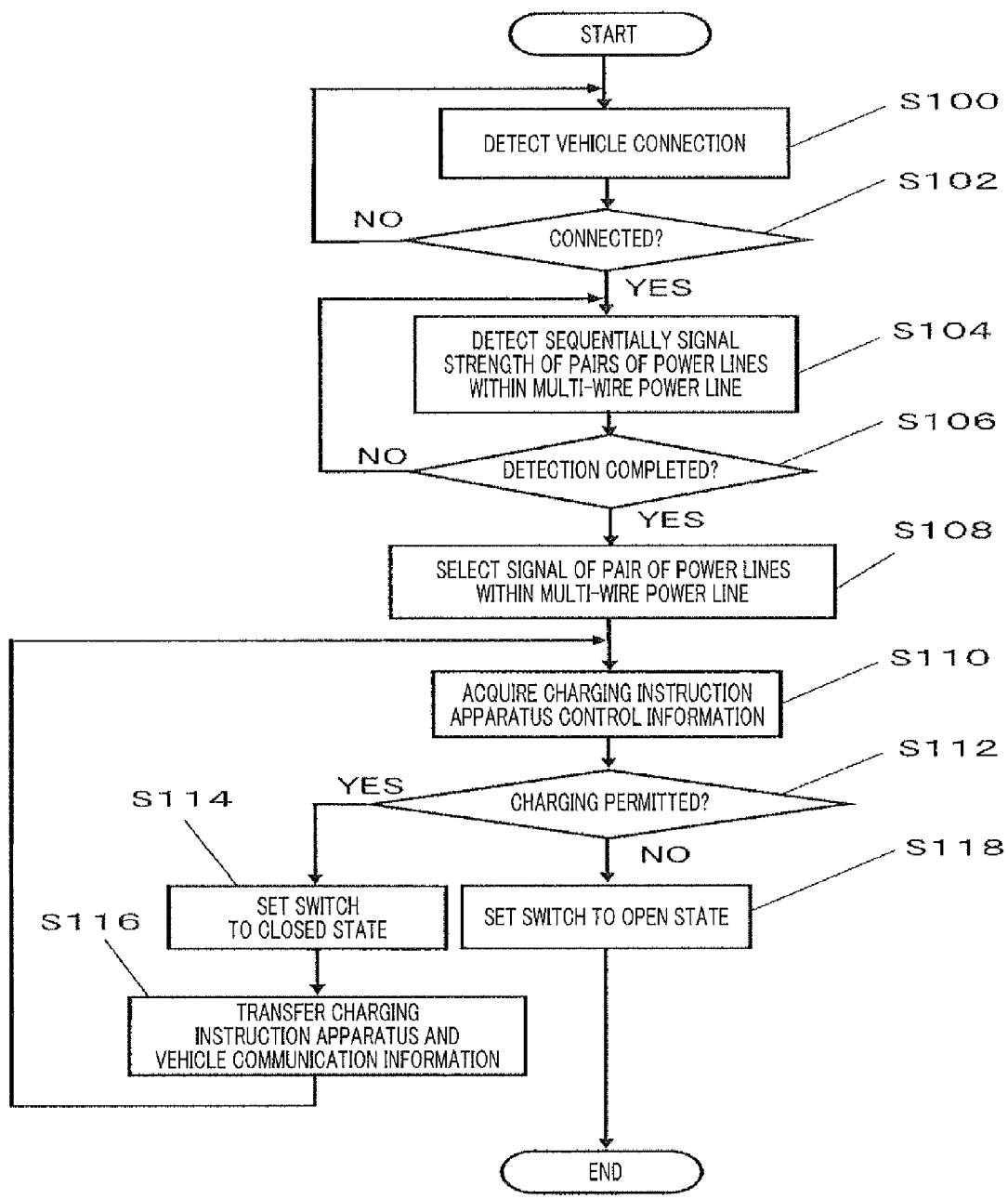
FIG. 4 is a flowchart explaining the operation of the above vehicle charging system.

Next, the operation of vehicle charging system 1 will be described with reference to FIGS. 1, 2, 3, and 4. FIG. 4 is a flowchart explaining the operation of vehicle charging system 1 according to this embodiment.

First, in vehicle charging system 1, connection of vehicle 8 is detected by inserting vehicle power line 7 of vehicle charging apparatus 6 into power socket 9 of vehicle 8 (S100, S102).

In vehicle charging system 1, when vehicle 8 is connected, vehicle charging apparatus 6 detects which power line pair within the multi-wire power line charging instruction apparatus 5 is connected to (S104, S106).

In vehicle charging system 1, switching section 13c of power line communication section 61 of vehicle charging apparatus 6 is sequentially switched by control section 62, and an inquiry signal for establishing communication is transmitted to charging instruction apparatus 5. Then, power line communication section 61 receives a response signal in response to the inquiry signal from charging instruction apparatus 5 from the pair of power lines subject to the switching and detects the power line pair to which charging instruction apparatus 5 is connected, and selects the signal of the detected power line pair (S108).

Specifically, power line communication section 61 switches its internal switch (switching section 13*c*) to the coupler with the greatest signal strength among the first couplers (first couplers 13*b*, 14*b*, and 15*b*) connected to power line pairs, and selects the signal of the coupler subject to the switching.

Not only signal strength but also the signal error rate or communication speed may be used as an indicator for selecting first coupler 13*b*, 14*b*, or 15*b*. If the signal error rate is used as the indicator, the first coupler with the lowest error rate is selected, and if the communication speed is used as the indicator, the first coupler with the fastest communication speed is selected.

Next, in vehicle charging system 1, vehicle charging apparatus 6 acquires an instruction by means of control information from charging instruction apparatus 5 (S110), and controls switch 63*a* of power line connection section 63 so as to be placed in a closed state if the control information indicates permission of charging (S112, S114). Also, vehicle charging apparatus 6 performs transfer so as to enable authentication information, charging information, and so forth to be mutually exchanged between charging instruction apparatus 5 and vehicle 8 (S116). Steps S110 through S116 are executed repeatedly until charging of vehicle 8 is completed.

On the other hand, if the control information indicates non-permission of charging, switch 63*a* of power line connection section 63 is controlled in vehicle charging system 1 so as to be placed in an open state (S112, S118).

If a plurality of communication apparatuses other than charging instruction apparatus 5 are connected to power lines 3*a* through 3*c*, a vehicle can perform power line communication not only with charging instruction apparatus 5 but also with the plurality of other communication apparatuses. In that case, however, the communication efficiency will fall if processing to sequentially measure the signal strength, signal error rate, and signal communication speed, and select the optimal first coupler, is performed each time a signal is received from one of the communication apparatuses.

To overcome the above problem, association information in which address information (an IP address, MAC address, or the like) of charging instruction apparatus 5 or a communication apparatus is associated with a first coupler selected by charging instruction apparatus 5 or the communication apparatus is stored in a storage section (not shown). Using the association information enables control section 62 to transmit a control signal that selects a suitable first coupler to switching section 13*c* simply by analyzing the address information of the signal received by modulation/demodulation section 11. Therefore, processing to sequentially measure the signal strength, signal error rate, and signal communication speed of signals received from first couplers 13*b* through 15*b* can be omitted, improving the communication efficiency.

As described above, according to this embodiment, as shown in FIGS. 1 and 2, vehicle charging apparatus 6 is provided with power line communication section 61 that performs power line communication via a multi-wire power line or vehicle power line 7; power line connection section 63 that connects a pair of power lines within the multi-wire power line to vehicle power line 7, and control section 62 that controls connection or disconnection of power line connection section 63 in response to an instruction from charging instruction apparatus 5; and power line communication section 61 selects a signal from the pair of power lines within the multi-wire power line and communicates with charging instruction apparatus 5, and performs power line communication with vehicle 8 via vehicle power line 7.

This configuration enables vehicle charging apparatus 6 to select signals of different power line pairs and perform communication. Accordingly, even if vehicle charging apparatus 6 and charging instruction apparatus 5 are connected to pairs of power lines having different phases in the multi-wire power line, vehicle charging apparatus 6 and charging instruction apparatus 5 can perform stable communication, and power can be supplied from vehicle charging apparatus 6 to vehicle 8 via vehicle power line 7 in accordance with an instruction from charging instruction apparatus 5.

Also, vehicle charging system 1 is provided with above-described vehicle charging apparatus 6 connected to the multi-wire power line and charging instruction apparatus 5 connected to the multi-wire power line, and vehicle charging apparatus 6 supplies power to vehicle 8 based on the instruction from charging instruction apparatus 5.

By this means, even if vehicle charging apparatus 6 and charging instruction apparatus 5 are connected to pairs of power lines having different phases in the multi-wire power line, stable communication can be performed since vehicle charging apparatus 6 can select a signal of a different power line pair. This enables power to be supplied from vehicle charging apparatus 6 to vehicle 8 via vehicle power line 7 in accordance with the instruction from charging instruction apparatus 5.

Figure 5:
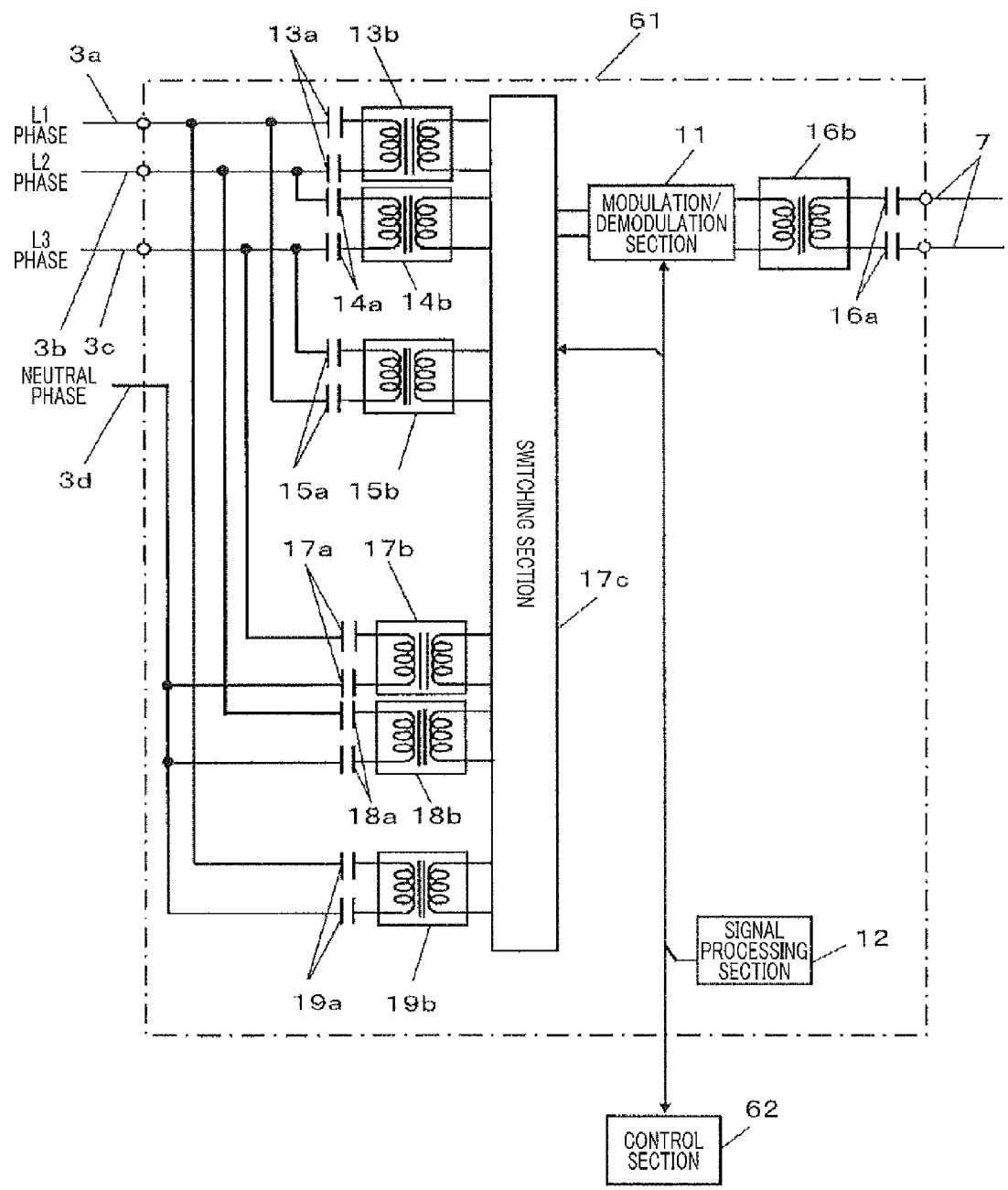
FIG. 5 is a block diagram showing another configuration of the power line communication section shown in FIG. 3.

In FIG. 2, a single-phase three-wire system is illustrated, but the present invention is not limited to this configuration. The present invention can also be applied to different types of multi-wire power line. For example, the present invention can also be applied to the case of a three-phase four-wire system. In this case, as shown in FIG. 5, capacitors 17*a*, capacitors 18*a*, and capacitors 19*a*, and first couplers 17*b*, 18*b*, and 19*b*, are additionally provided to support a four-phase system, and any one of first couplers 13*b*, 14*b*, 15*b*, 17*b*, 18*b*, and 19*b* can be selected by switching of switching section 17*c*. In addition, the present invention can also be applied in a similar way to a three-phase three-wire system.

The specific configuration of the present invention is not limited to the above-described embodiment, and various variations and modifications may be possible without departing from the scope of the present invention.

Also, an electric vehicle has been described as an example, but the present invention is not limited to this, and can also be applied, for example, to a hybrid vehicle that uses both a motor and an engine.

The disclosure of Japanese Patent Application No. 2010-018183, filed on Jan. 29, 2010, including the specification, drawings and abstract, is incorporated herein by reference in its entirety.

INDUSTRIAL APPLICABILITY

A vehicle charging apparatus according to one aspect of the present invention supplies power supplied from a pair of power lines within a multi-wire power line, to a vehicle via a vehicle power line, based on an instruction from a charging instruction apparatus connected to the multi-wire power line, and the vehicle charging apparatus is provided with a power line communication section that performs power line communication via the multi-wire power line or the vehicle power line; a connection section that connects a pair of power lines within the multi-wire power line to the vehicle power line; and a control section that controls connection or disconnection of the connection section in response to an instruction from the charging instruction apparatus; wherein the power line communication section selects a signal from the pair of power lines within the multi-wire power line and communicates with the charging instruction apparatus, and also performs communication with the vehicle via the vehicle power line, so that the vehicle charging apparatus can perform stable communication by selecting a signal of a different power line pair, and can communicate stably even if the vehicle charging apparatus and the charging instruction apparatus are connected to pairs of power lines having different phases in the multi-wire power line. This enables power to be supplied from the vehicle charging apparatus to the vehicle via the vehicle power line in accordance with the instruction from the charging instruction apparatus.

Thus, the present invention is suitable for use in a vehicle charging apparatus that supplies power to a vehicle such as an electric vehicle or hybrid vehicle that runs by charging an electrical storage apparatus with power and using that stored power to rotate the wheels, and for use in a vehicle charging system that uses this.

REFERENCE SIGNS LIST

1 Vehicle charging system
2 Residence
3 Power source
3a, 3b, 3c, 3d Power line
4, 61 Power line communication section
5 Charging instruction apparatus
6 Vehicle charging apparatus
7 Vehicle power line
8 Vehicle
8a Vehicle body
9 Power socket
10 Electrical storage apparatus
11 Modulation/demodulation section
12 Signal processing section
13a, 14a, 15a, 16a, 17a, 18a, 19a Capacitors
13b, 14b, 15b, 17b, 18b, 19b First coupler
16b Second coupler
62 Control section
63 Power line connection section
63a Switch

The invention claimed is:

1. A vehicle charging apparatus that communicates with a communication apparatus and charges a vehicle, the communication apparatus performing power line communication via a power line that includes at least three conducting wires, the at least three conducting wires including a plurality of pairs of conducting wires, the vehicle charging apparatus comprising:
   a communicator that receives a signal transmitted from the communication apparatus via a pair of conducting wires within the power line;
   a switch that selects the pair of conducting wires among the plurality of pairs of conducting wires based on the signal received by the communicator; and
   a storage that stores correspondence between the pair of conducting wires and address information corresponding to the communication apparatus, wherein:
   the communicator reads the address information of the signal from the communication apparatus; and
   the switch selects the pair of conducting wires among the plurality of pairs based on the address information read by the communicator.

2. The vehicle charging apparatus according to claim 1, further comprising:
   a vehicle power line used for charging the vehicle;
   a power line connector that connects or disconnects between the power line and the vehicle power line; and
   a controller that controls connection or disconnection of the power line connector based on the signal received by the communicator.

3. The vehicle charging apparatus according to claim 1, wherein the communicator communicates with the vehicle.

4. The vehicle charging apparatus according to claim 1, further comprising:
   a plurality of first couplers that are respectively connected to different pairs of conducting wires via respective capacitors; and
   a second coupler that is connected to the communicator, and is also connected to the vehicle power line via a capacitor,
   wherein the switch selects one of the plurality of first couplers and is connected to the selected first coupler.

5. The vehicle charging apparatus according to claim 1, further comprising a signal processor that decodes the signal received by the communicator.

6. The vehicle charging apparatus according to claim 1, wherein the switch selects the pair of conducting wires based on a strength of the signal received by the communicator.

7. The vehicle charging apparatus according to claim 1, wherein the switch selects the pair of conducting wires based on an error rate of the signal received by the communicator.

8. The vehicle charging apparatus according to claim 1, wherein the switch selects the pair of conducting wires based on a communication speed of the signal received by the communicator.

9. The vehicle charging apparatus according to claim 2, wherein the controller controls the power line connector so as to be in a connecting state when the communicator receives a signal indicating permission of charging from the communication apparatus, and controls the power line connector so as to be in a disconnecting state when the communicator receives a signal indicating non-permission of charging from the communication apparatus.

10. A vehicle charging method that communicates with a communication apparatus and charges a vehicle, the communication apparatus performing power line communication via a power line that includes at least three conducting wires, the at least three conducting wires including a plurality of pairs of conducting wires, the vehicle charging method comprising:
   receiving a signal transmitted from the communication apparatus via a pair of conducting wires within the power line;
   selecting the pair of conducting wires among the plurality of pairs of conducting wires based on the received signal;
   storing correspondence between the pair of conducting wires and address information corresponding to the communication apparatus;
   reading the address information of the signal from the communication apparatus; and
   selecting the pair of conducting wires among the plurality of pairs based on the address information.

11. A vehicle charging system comprising:
   the vehicle charging apparatus according to claim 1; and
   a communication apparatus connected to a power line that includes at least three conducting wires,
   wherein the vehicle charging apparatus charges a vehicle based on a signal transmitted from the communication apparatus.

12. A vehicle charging apparatus that communicates with a communication apparatus and charges a vehicle, the communication apparatus performing power line communication with the vehicle charging apparatus via a power line that includes at least three conducting wires, the at least three conducting wires including at least a first pair of conducting wires and a second pair of conducting wires, the vehicle charging apparatus comprising:

a communicator that receives a signal from the communication apparatus via the first pair of conducting wires;

a switch that selects the first pair of conducting wires from the first and second pairs of conducting wires and connects the communication apparatus and the vehicle charging apparatus using the selected first pair of conducting wires; and a storage that stores correspondence between the first pair of conducting wires and address information corresponding to the communication apparatus, wherein:

the communicator reads the address information from the signal from the communication apparatus; and the switch selects the first pair of conducting wires based on the address information.

13. The vehicle charging apparatus according to claim 12, further comprising:

a vehicle power line used for charging the vehicle;

a power line connector that connects or disconnects between the power line and the vehicle power line; and a controller that controls connection or disconnection of the power line connector based on the signal received by the communicator.

14. The vehicle charging apparatus according to claim 12, wherein the communicator communicates with the vehicle.

15. The vehicle charging apparatus according to claim 12, further comprising:

two first couplers that are respectively connected to the first and second pairs of conducting wires via respective capacitors; and a second coupler that is connected to the communicator, and is also connected to the vehicle power line via a capacitor, wherein the switch selects one of the two first couplers and is connected to the selected first coupler.

16. The vehicle charging apparatus according to claim 12, further comprising a signal processor that decodes the signal received by the communicator.

17. The vehicle charging apparatus according to claim 12, wherein the switch selects the first pair of conducting wires based on a strength of the signal received by the communicator.

18. The vehicle charging apparatus according to claim 12, wherein the switch selects the first pair of conducting wires based on an error rate of the signal received by the communicator.

19. The vehicle charging apparatus according to claim 12, wherein the switch selects the first pair of conducting wires based on a communication speed of the signal received by the communicator.

20. The vehicle charging apparatus according to claim 13, wherein the controller controls the power line connector so as to be in a connecting state when the communicator receives a signal indicating permission of charging from the communication apparatus, and controls the power line connector so as to be in a disconnecting state when the communicator receives a signal indicating non-permission of charging from the communication apparatus.

* * * * *